(12) United States Patent
Wigren

(10) Patent No.: US 8,982,701 B2
(45) Date of Patent: Mar. 17, 2015

(54) LOAD ESTIMATION FOR CELL STABILITY IN INTERFERENCE WHITENING SYSTEMS

(75) Inventor: Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 74 days.

(21) Appl. No.: 13/581,592

(22) PCT Filed: Apr. 27, 2010

(86) PCT No.: PCT/SE2010/050464
§ 371 (c)(1),
(2), (4) Date: Aug. 28, 2012

(87) PCT Pub. No.: WO2011/136706
PCT Pub. Date: Nov. 3, 2011

(65) Prior Publication Data
US 2013/0039184 A1 Feb. 14, 2013

(51) Int. Cl.
*H04W 24/02* (2009.01)
*H04B 1/12* (2006.01)
*H04B 17/00* (2006.01)

(52) U.S. Cl.
CPC ........ *H04B 17/0042* (2013.01); *H04B 17/0045* (2013.01); *H04B 17/005* (2013.01); *H04B 17/0057* (2013.01); *H04B 17/006* (2013.01);
(Continued)

(58) Field of Classification Search
None
See application file for complete search history.

(56) References Cited

U.S. PATENT DOCUMENTS

2006/0229089 A1 10/2006 Tokgoz
2008/0227400 A1* 9/2008 Wigren ...................... 455/67.13
(Continued)

FOREIGN PATENT DOCUMENTS

GB 2425684 A * 11/2006
WO 2006076969 A1 7/2006
(Continued)

OTHER PUBLICATIONS

Fulghum, Tracy L. et al, "Adaptive Generalized Rake Reception in DS-CDMA Systems," IEEE Transactions on Wireless Communications, Jul. 2009, pp. 1-11.
(Continued)

*Primary Examiner* — Hassan Phillips
*Assistant Examiner* — Ayanah George
(74) *Attorney, Agent, or Firm* — Murphy Bilak & Homiller, PLLC

(57) ABSTRACT

A noise rise estimation method calculates (230) a noise rise measure suitable for stability control purposes, based at least on a useful signal power for the first user after interference whitening, a first user noise floor compensation factor, a code power to interference ratio measure for the first user, a noise floor measure and an estimated neighbour cell interference power. These factors are provided by measuring (210) received total wideband power and generating (212) a measure of an own cell power. An estimate of the noise floor measure is computed (214) and the neighbour cell interference power is estimated (216) based on these measurements and generated measures. An interference whitening is performed (220). The useful signal power for the first user after interference whitening is determined (222). The first user noise floor compensation factor is derived (224) based on combining weights for the first user used in for the first user is obtained (226).

14 Claims, 5 Drawing Sheets

(52) U.S. Cl.
CPC .......... *H04B 17/0077* (2013.01); *H04B 17/007* (2013.01)
USPC .......................................... 370/235; 455/522

(56) References Cited

U.S. PATENT DOCUMENTS

| | | | |
|---|---|---|---|
| 2009/0213909 A1* | 8/2009 | Grant et al. | 375/148 |
| 2012/0163420 A1* | 6/2012 | Persson et al. | 375/144 |

FOREIGN PATENT DOCUMENTS

| | | |
|---|---|---|
| WO | 2007024166 A1 | 3/2007 |
| WO | 2007055626 A1 | 5/2007 |
| WO | 2008039123 A1 | 4/2008 |
| WO | 2008097145 A1 | 8/2008 |
| WO | 2009116905 A1 | 9/2009 |
| WO | 2011031193 A1 | 3/2011 |

OTHER PUBLICATIONS

3GPP, "3rd Generation Partnership Project; Technical Specification Group Radio Access Network; Requirements for support of radio resource management (FDD) (Release 6)", 3GPP TS 25.133 V6.10.0, Jun. 2006, pp. 1-164.

Wigren, Torbjörn et al., "Estimation of uplink WCDMA load in a single RBS", IEEE 66th Vehicular Technology Conference 2007, IEEE Conference Publications, Baltimore, MD, USA., Sep. 30-Oct. 3, 2007, pp. 1-5.

Wigren, Torbjörn, "Soft Uplink Load Estimation in WCDMA", IEEE Transactions on Vehicular Technology, vol. 58, Issue 2, Feb. 2009, pp. 760-772.

* cited by examiner

US 8,982,701 B2

LOAD ESTIMATION FOR CELL STABILITY IN INTERFERENCE WHITENING SYSTEMS

TECHNICAL FIELD

The present invention relates in general to methods and devices for estimation of power-related quantities in cellular communications systems and in particular to such methods and devices intended for cell stability purposes in cellular communications systems using interference whitening.

BACKGROUND

Wideband Code Division Multiple Access (WCDMA) telecommunication systems have many attractive properties that can be used for future development of telecommunication services. In particular, the enhanced uplink of the WCDMA system is one ingredient in the mobile broadband solution of WCDMA. Now, in order to retain stability of a WCDMA cell, possibly a cell running enhanced uplink, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thea mal noise floor, based on which a noise rise measure can be estimated. An optimal and soft algorithm for noise rise estimation based on a similar basic idea of minimum values is disclosed in the published international patent application WO 2007/024166.

The instantaneous load was in such an approach obtained from two load measures addressing coverage and cell stability. The load measure for coverage was obtained by the use of a dedicated algorithm which estimates the rise over thermal (RoT), from measurements of the received total wideband power (RTWP). The cell stability was obtained by a so called load factor calculation, exploiting channel powers subject to fast inner loop power control.

To handle increasing uplink data rates, interference cancellation (IC) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of the new IC receiver structure in order to be able to utilize the entire amount of resources. Unless such load estimates are made available it will not be possible to exploit the link gains fully, when scheduling EUL users. In the published international patent application WO 2008/097145, load estimation with IC of this conventional type is handled in analogy with earlier noise rise estimation procedures.

Another approach to limit the effect of interference is to use some kind of interference whitening approaches, such as GRAKE, GRAKE+ or chip equalizer. The RAKE receiver is the standard receiver in WCDMA systems, see e.g. H. Holma and A. Toskala, *WCDMA for UMTS—Radio Access for Third Generation Mobile Communications*. Chichester, UK: Wiley, 2001, pp. 27-30. The GRAKE+ receiver is an extension of the RAKE receiver in that an additional step is introduced that transforms the received signal to one that is spectrally white, before RAKE processing is performed, see e.g. L. Fulghum, D. A. Cairns, C. Cozzo, Y.-P. E. Wang and G. E. Bottomley, "Adaptive generalized Rake reception in DS-CDMA systems, Submitted to *IEEE Trans. Wireless Commun.*, 2008. The basic difference with GRAKE+ as compared to conventional RAKE, is that each user sees a reduced level of interference, immediately after the weight combining step. In GRAKE+, a covariance matrix $\hat{R}_u$, $u=1, \ldots, U$, with an order equal to the number of fingers is first estimated to capture the interference. The codes not used by the present user u may be used in order to estimate the covariance matrix $\hat{R}_u$. The GRAKE+ receiver thus uses an estimated covariance matrix $\hat{R}_u$ that models the interference for computation of the combining weights for the users u, $u=1, \ldots, U$. Expressed mathematically, it can be written:

$$\hat{R}_u \hat{w}_u = \hat{h}_u, \quad u=1, \ldots, U, \tag{1}$$

where $\hat{h}_u$, $u=1, \ldots, U$, is the net channel response of user u and where $\hat{w}_u$ are the combining weights. The effect of (1) is that GRAKE+ essentially whitens the correlated interference and removes large spectral peaks from interferers at certain finger locations and for certain antenna elements. Thus, in GRAKE+, the user experiences a reduced level of interference, immediately after the weight combining step. Note that GRAKE+ is still a linear receiver.

In order to utilize the reduced interference provided by the GRAKE+ receiver, the load estimations have to be performed taking the interference whitening of the GRAKE+ into account. The availability of load estimates is important for the admission and congestion control functionality of the RNC. The reason being that these functions will otherwise limit the exploitation of the link gains associated with the interference cancelling or interference cancelling receivers. However, in contrary to what is valid for interference cancellation based on regeneration and subtraction, the thermal noise floor is changed in the same manner as the interference reduction obtained by the GRAKE+ process, and can no longer be treated as constant after interference whitening. In order to measure the instantaneous load, accounting for IC gains, it is necessary to address the load after the GRAKE+ interference whitening step. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available. Similar problems are present for systems utilizing GRAKE, where sub-blocks of the covariance matrix of (1) are used.

Further more, as briefly mentioned above, a rise over thermal (RoT) measure, typically available from measurements of the received total wideband power (RTWP) when the GRAKE+ influence is taken into account, is useful for addressing cell coverage. However, for the purpose of obtaining a highly reliable cell stability, such RoT measures are not as effective since powers that are not subject to fast inner loop power control are included in the analysis.

There is a related type of interference whitening receiver for WCDMA which is also linear, denoted the chip equalizer. The difference between GRAKE+ and the chip equalizer is simply the order of certain basic operations. The consequence is that the problems of providing a reliable noise rise measure for cell stability are valid for the systems using the chip equalizer as well.

SUMMARY

An object of the present invention is thus to provide methods and arrangements for providing reliable noise rise estimations for cell stability purposes in wireless communication systems using interference whitening methods, such as the GRAKE+ or the chip equalizer receivers. A further object is to provide such methods and arrangements, in which the requested computational power is relatively limited.

The object is achieved by methods and arrangements according to the enclosed independent patent claims. Preferred embodiments are defined by the dependent claims. In general, in a first aspect, a method of noise rise estimation in a wireless communication system comprises measuring of received total wideband power a plurality of times and generation of a measure of an own cell power a plurality of times. An estimate of a noise floor measure is computed based on at least a number of the measured received total wideband powers and the generated measures of an own cell power. A neighbour cell interference power for a first user is estimated based on at least a number of the measured received total wideband powers and the generated measures of an own cell power. An interference whitening is performed based on one of GRAKE, GRAKE+ and chip equalizer for the first user. A useful signal power for the first user after interference whitening is determined. A first user noise floor compensation factor is derived based on combining weights for the first user used in the interference whitening. A code power to interference ratio measure for the first user is obtained. A noise rise measure for the first user is calculated, based at least on the useful signal power for the first user after interference whitening, the first user noise floor compensation factor, the code power to interference ratio measure for the first user, the noise floor measure and the estimated neighbour cell interference power.

In a second aspect, an arrangement for noise rise estimation in a wireless communication system comprises a digital receiver, an interference whitener connected to the digital receiver and a processor connected to the digital receiver and to an output from the interference whitener. The interference whitener is based on one of GRAKE, GRAKE+ and chip equalizer and is configured to provide interference whitening for a plurality of users at the output. The processor is configured to measure received total wideband power received at the digital receiver a plurality of times and configured to generate a measure of an own cell power a plurality of times. The processor is further configured to compute an estimate of a noise floor measure based on at least a number of the measured received total wideband powers and the generated measures of an own cell power. The processor is further configured to compute an estimate of a neighbour cell interference power for individual ones of the plurality of users based on at least a number of the measured received total wideband powers and the generated measures of an own cell power. The processor is further configured to determine a useful signal power for a first user of the plurality of users after interference whitening and to derive a first user noise floor compensation factor based on combining weights for the first user used in the interference whitening. The processor is further configured to obtain a code power to interference ratio measure for the first user. The processor is further configured to calculate a noise rise measure for the first user, based at least on the useful signal power for the first user after interference whitening, the first user noise floor compensation factor, the code power to interference ratio measure for the first user, the noise floor measure and the estimated neighbour cell interference power.

In a third aspect, a load scheduler of a wireless communication system comprising an arrangement for noise rise estimation according to the second aspect. The load scheduler is further configured to schedule uplink load in the wireless communication system based on the estimated noise rise measure.

In a fourth aspect, a base station of a wireless communication system comprises an arrangement for noise rise estimation according to the second aspect.

One advantage with the present invention is that the reduced interference levels achieved by GRAKE+ or chip equalizer can be fully utilized to increase the total available capacity of a wireless communication system by a load measure suitable for cell stability purposes. This can be performed even with a relatively limited available computational power.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
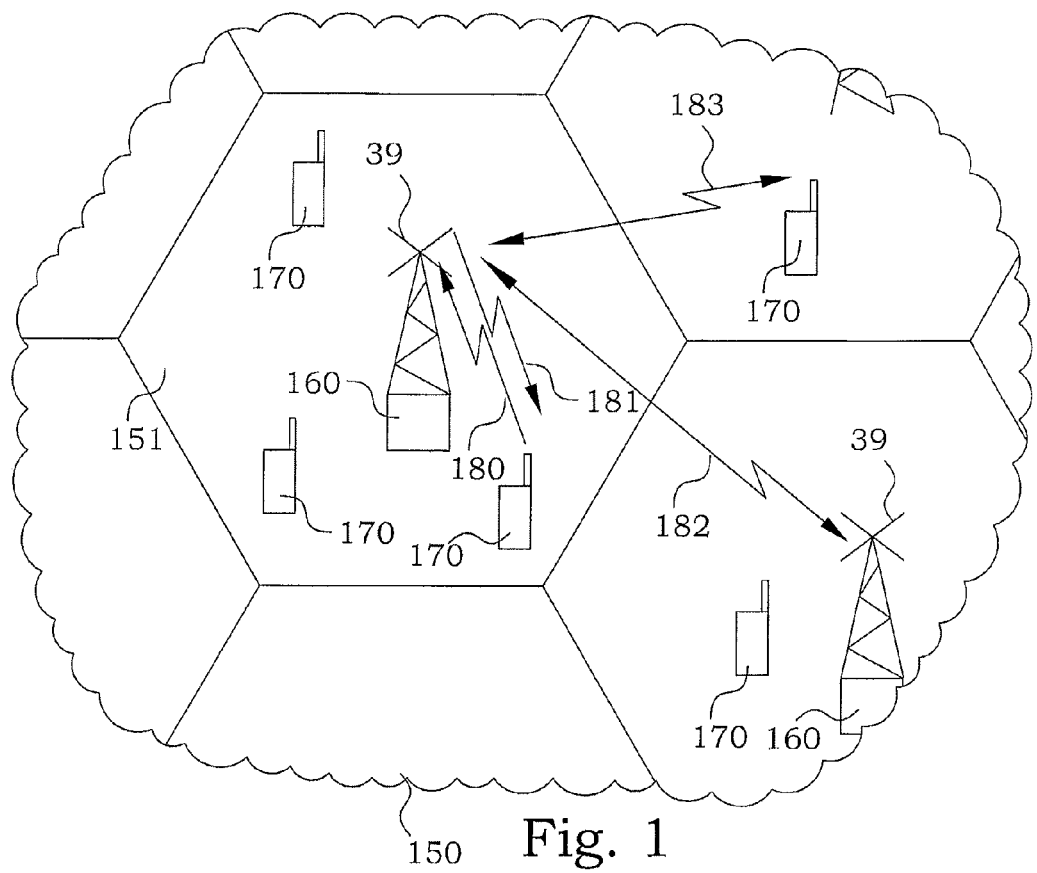
FIG. 1 is a schematic illustration of a wireless communication system.

Throughout the entire disclosure, bold letters in equations refer to vector or matrix quantities.

In the drawings, corresponding reference numbers are used for similar or corresponding parts.

The present invention discloses new load measures, directly associated with cell stability, and the estimation of these load measures. The disclosure builds on means for the estimation of the RoT after e.g. interference whitening, i.e. the coverage related load measure. That part of the invention discloses algorithms for code power estimation per user, as seen after interference whitening, thereby capturing the effect of IC. The procedure further comprises user code power to interference ratio estimation, as seen after interference whitening, thereby capturing the effect of IC. The procedure also comprises noise floor scale factor estimation per user, as seen after interference whitening. Furthermore, RoT estimation per user, as seen after interference whitening, is provided, thereby capturing the effect of IC, using the channel power estimate per user, the user code power to interference ratio estimate per user and the noise floor scale factor per user. The load estimation (uplink) per cell, as seen after interference whitening, is obtained, thereby capturing the effect of IC (and SIC), using the channel power estimates per user, the signal to interference estimates per user, the scale factors per user and the RoT estimates per user.

In order to further providing a new load measure suitable for cell stability purposes in the presence of IC functionality, additional means for computation of neighbour cell interference powers, for each user after interference whitening, are provided. A new noise rise measure is obtained, different from the RoT, that addresses the cell stability directly, for each user after GRAKE+ interference whitening. Means for low complexity computation of the new noise rise measure are provided, for each user after interference whitening. The computation is performed from the RoT measure described here above. The neighbour cell interference powers and a thermal noise power floor estimate are provided. Finally, a combining means is provided, computing a cell stability load measure for the uplink of an EUL cell, after interference whitening. A further property of the invention is that it does not require any additional measurements at baseband level.

With the present invention, the assessment of the load directly related to cell stability is available.

The present invention relates to arrangements and methods in wireless communication systems. FIG. 1 illustrates a schematic view of an embodiment of such a wireless communication system 150. A radio base station 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 183.

In order to understand the solved problems and advantages with the present invention, a short summary of load estimation principles are first presented, some of it being part of prior art. Without IC, the load at an antenna connector is given by the noise rise, typically the rise over theiinal (RoT), RoT (t), defined by:

$$RoT(t) = \frac{RTWP(t)}{N(t)}, \quad (2)$$

where N(t) is the thermal noise level as measured at the antenna connector. It remains to define what is meant with RTWP(t). This relative measure is unaffected of any de-spreading applied. The definition used here is simply the total wideband power:

$$RTWP(t) = \sum_{k=1}^{K} P_k(t) + I^N(t) + N(t), \quad (3)$$

also measured at the antenna connector. Here $I^N(t)$ denotes the power as received from neighbour cells ($^N$) of the communication system. Also any power from external sources may be included in that term. As will be seen below, the major difficulty of any RoT estimation algorithm is to separate the theanal noise power from the interference from neighbour cells.

Another specific problem that needs to be addressed when determining the load is that the signal reference points are, by definition, at the antenna connector. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (3) are equally affected by the scale factor error so when (2) is calculated, the scale factor error is cancelled as $$RoT^{Digital\ Receiver}(t) = \qquad (4)$$

$$\frac{RTWP^{Digital\ Receiver}(t)}{N^{Digital\ Receiver}(t)} = \frac{\gamma(t)RTWP^{Antenna}(t)}{\gamma(t)N^{Antenna}(t)} = RoT^{Antenna}(t).$$

In order to understand the fundamental problem of neighbour cell interference when performing load estimation, note that $$I^N(t)+N(t)=E[I^N(t)]+E[N(t)]+\Delta I^N(t)+\Delta N(t), \quad (5)$$

where E[ ] denotes mathematical expectation and where Δ denotes the variation around the mean. The fundamental problem can now be clearly seen. Since there are no measurements available in the RBS that are related to the neighbour cell interference, a linear filtering operation can at best estimate the sum E[$I^N$(t)]+E[N(t)]. This estimate cannot be used to deduce the value of E[N(t)]. The situation is the same as when the sum of two numbers is available. Then there is no way to figure out the values of the individual numbers. This issue is analysed rigorously for the RoT estimation problem in published international patent application WO 2007/024166 where it is proved that the noise power floor is not mathematically observable.

Figure 2:
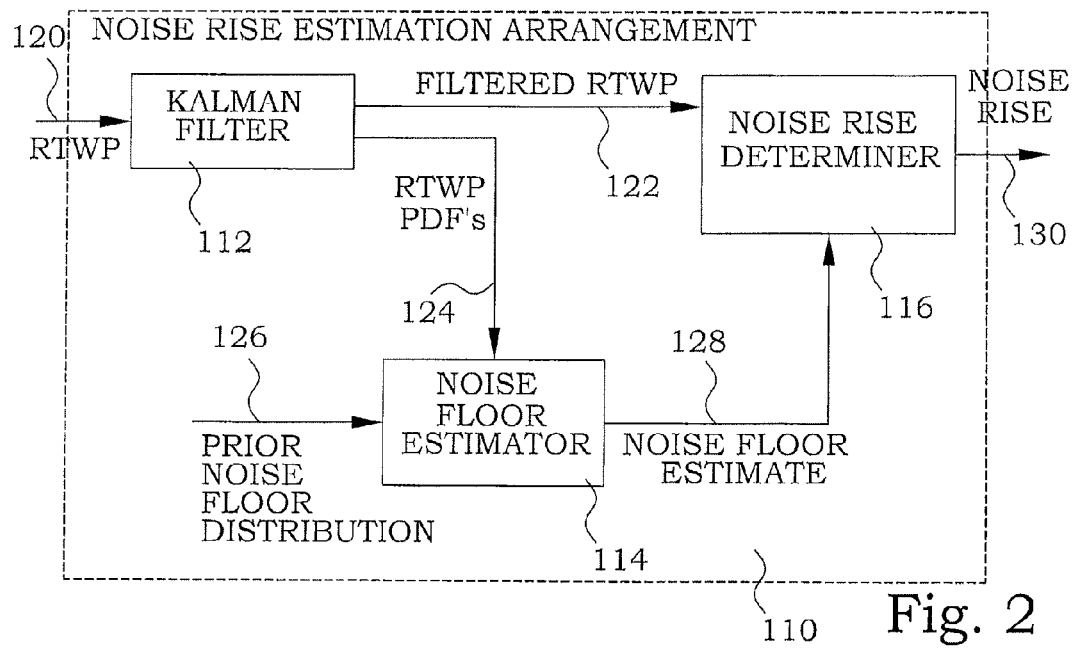
FIG. 2 is a schematic illustration of a noise rise estimation arrangement.

An embodiment of the RoT estimation algorithm currently in use is depicted in FIG. 2. It is described in detail in the published international patent application WO 2007/024166. The algorithm estimates the RoT, as given by (2). The main problem solved by the estimation algorithm is the accurate estimation of the thermal noise floor N(t). Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is important to understand that this estimation relies on the fact that the noise floor is constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IC is introduced in the uplink. To reduce the memory consumption a recursive algorithm was disclosed in the published international patent application WO 2007/0055626. That algorithm reduces the memory requirements of the sliding window scheme discussed above at least by a factor of 100. The invention disclosed here is applicable both to the sliding window RoT estimation algorithm and the recursive algorithm.

There are cell stability oriented load estimation algorithms non-IC systems since previous. Such cell stability load estimation functionality exploits load factors for each user. In their simplest form the load factors are given by:

$$L_u = \frac{P_u}{RTWP} = \frac{(C/I)_u}{1+(C/I)_u}, u = 1, \ldots, U, \quad (6)$$

where $P_u$ is the power of user u. Load factors are then summed up, for each power controlled user. In this way the neighbour cell interference is not included in the resulting load measure. This is reasonable since the neighbour cell interference should not affect the own cell power control loop, at least not when first order effects are considered.

Figure 3:
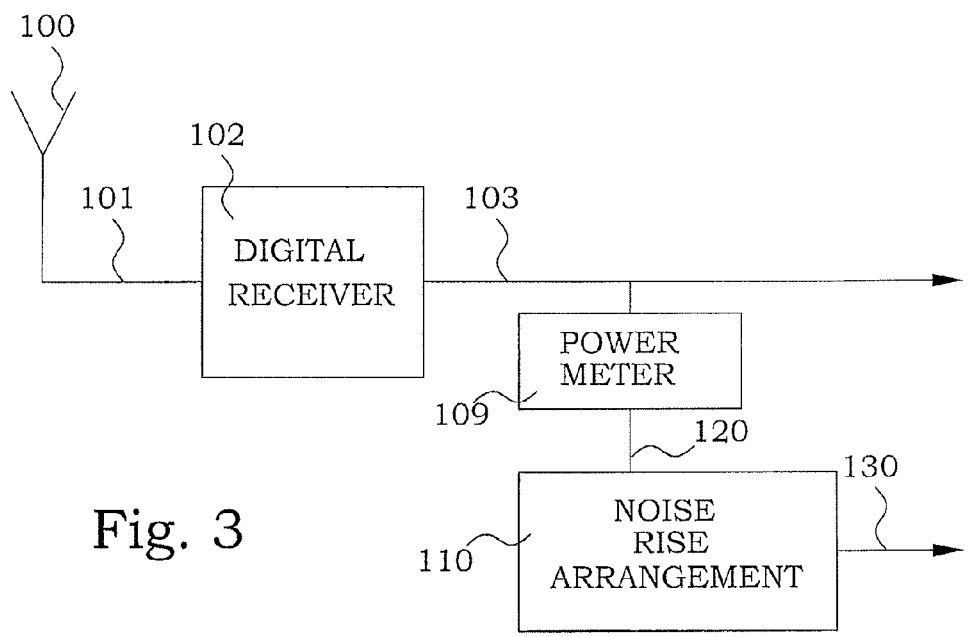
FIG. 3 is a schematic illustration of a receiver chain including a noise rise arrangement.

FIG. 3 schematically illustrates the arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
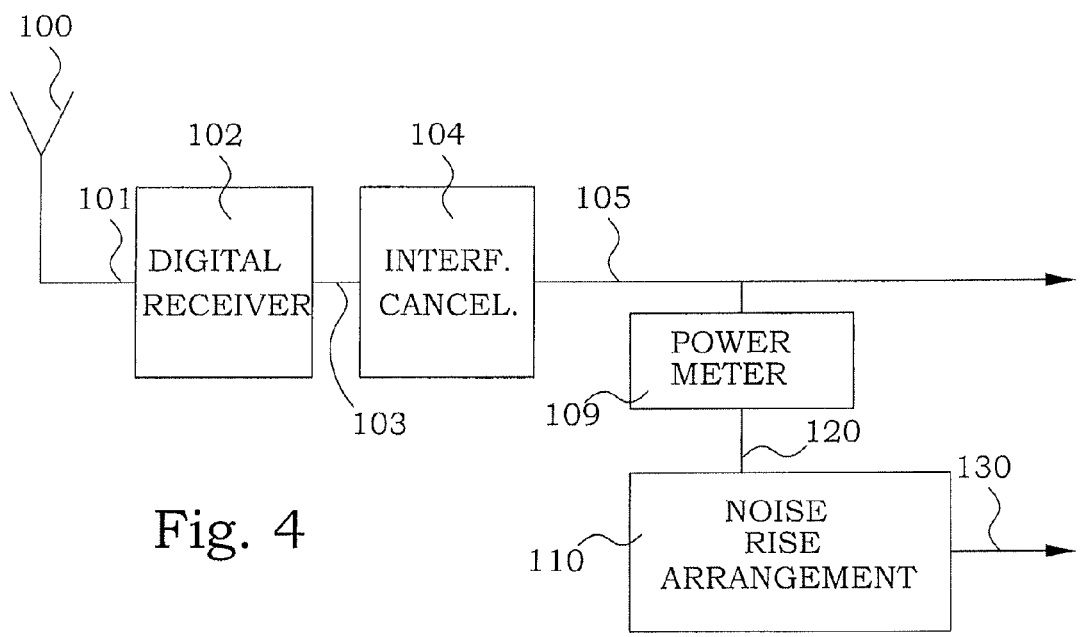
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user. Hence combining user interference to a general uplink cell load is no longer trivial.

The problems with existing solutions, known in prior art, is that load measures, in particular load measures directly addressing cell stability, after GRAKE+ interference whitening, are not available, thereby affecting EUL scheduler performance negatively. Means for computation of load measures addressing cell stability, after GRAKE+ interference whitening for each user, are not available either. Combining means, combining the load measures, after GRAKE+ interference whitening for each user, into a single load measure for the uplink of the cell, are also not available.

The present invention provides solutions where load estimations reflect the reduced interference experienced by users exploiting interference whitening receivers. The load of a particular single user exploiting GRAKE, GRAKE+ or the chip equalizer can be estimated. Also, the individual load estimations can be combined into a load estimation for the whole cell. Furthermore, a load measure directly assessing cell stability after GRAKE+ processing is provided.

The present invention disclosure is focused on GRAKE+. However, also systems using GRAKE or chip equalizers can be configured in a similar manner.

The invention discloses a new measure for load estimation that reflects the additional IC gain of the GRAKE+ receiver. The new load measure aims at complementing a previous rise over thermal load measure, by addressing cell stability directly. Further, the invention discloses means to compute neighbour cell interference after GRAKE+ processing, and to combine said neighbour cell interference with said RoT measure and a noise power floor estimated according to prior art, thereby obtaining said new load measure addressing cell stability directly. A further property of the invention is that it does not require any additional measurements at baseband level.

One important part of the present invention is a load measure that is directly assessing cell stability after GRAKE+ processing. As stated above the RoT is a general load measure in CDMA systems. Since it includes the neighbour cell interference it e.g. captures coverage effects of load changes. However, sometimes it is desirable to have access to load measures that directly assess the stability only of the serving cell. A measure that addresses this need is to be defined. To achieve this goal it can be noted that in normal operation the uplink cell stability is mainly affected by the powers that are under inner loop power control, by the RBS. This is not perfectly true though, remembering that the loops of the inner loop power control are nonlinear and furthermore coupled and therefore it is not easily guaranteed that large neighbour cell power increases may not affect the cell stability after all. Put otherwise, cell stability is coupled to feasibility which under certain conditions is tied also to the RoT.

Figure 5A:
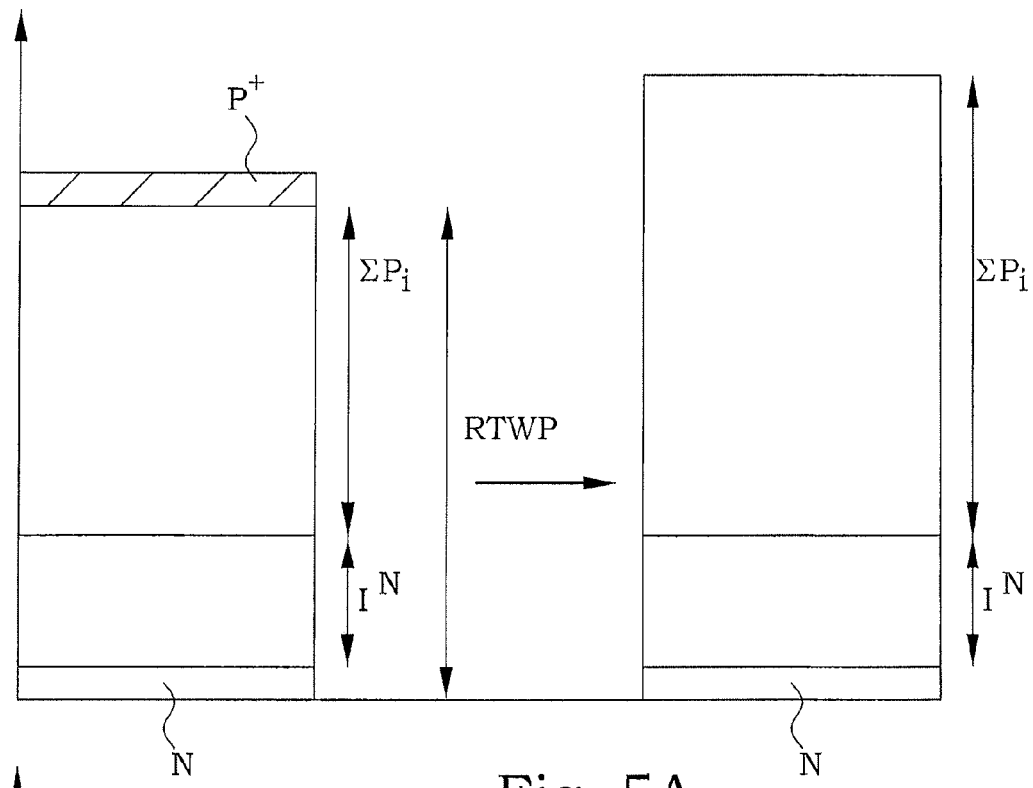
FIGS. 5A-B are schematic illustrations of power scheduling situations with different amounts of neighbour cell interference.
Figure 5B:
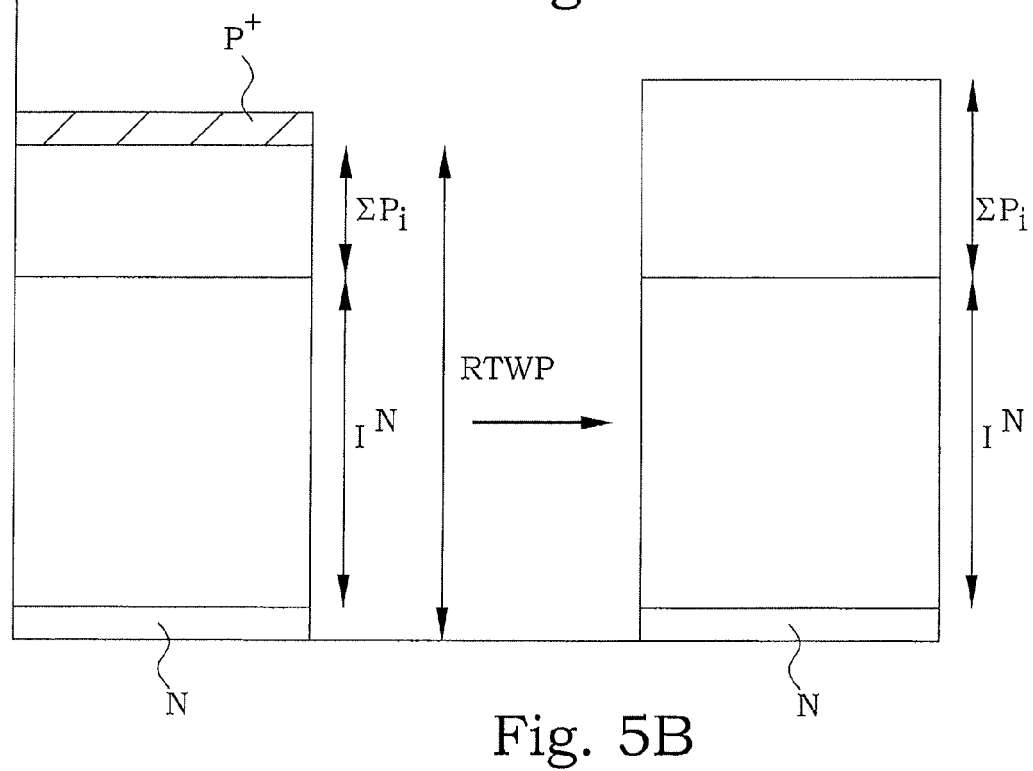

Some of this can be schematically illustrated by the diagrams of FIGS. 5A and 5B. IN FIG. 5A a total power RTWP (t) in the left part of the figure is divided according to (3) into the thermal noise N(t), the neighbour cell interference $I^N(t)$ and the signal powers $$\sum_{k=1}^{K} P_k(t).$$

If an additional load $P^+(t)$ is intended to be scheduled, the inner loop power control will influence the signal powers of the own RBS and the result will be the power situation in the right part of the figure. In FIG. 5B, the total power RTWP(t) and the thermal noise N(t) are the same and thereby the RoT measure. However, since a smaller part of the total power is affected by the inner loop power control, the final situation, in the right part of the figure, will differ from the case in FIG. 5A. The RoT will therefore not always be an appropriate measure to base stability scheduling on. A load measure directly assessing cell stability after GRAKE+ processing is of great interest.

The discussion concerning this is however somewhat idealized. First, the feasibility analysis is normally based on assumptions that the uplink is shared by a relatively large number of users, allowing interferers to be treated as noise sources. Secondly, the rise over thermal after GRAKE+ processing is an individual measure for each user—no formal proof is available on its precise relation to the uplink cell load and the cell stability issue. For this reason it seems reasonable to address also other measures than the RoT.

In order to obtain a noise rise measure suitable for stability control purposes, the neighbour cell interference can be subtracted from the RoT for each user, after GRAKE+ processing. Such a noise rise measure is thus valid for each user, after GRAKE+ processing.

The load estimations that reflect the reduced interference experienced by users exploiting interference whitening receivers can be obtained by estimating the received signal and exploiting results from the GRAKE process by matrix-vector operations in order to scale the noise floor estimate to the influence of the interference whitening process. Unfortunately, such operations require quite large computational power, which is why such a solution may be inappropriate for applications with limited available computational power. According to the present invention, only computation of inner products is necessary, which limits the required computational complexity significantly, possibly of the order of at least ten times.

The present approach uses the estimation at the point where the "sufficient statistics" (the performance metric) used for decoding is available. Sufficient statistics refers to the exact knowledge of the probability distribution functions of a stochastic process, over time. A Gaussian stochastic process is e.g. completely defined by its mean value and covariance matrix, both as a function of time—no other information is needed to write down the probability distribution functions of said Gaussian stochastic process. In case of the G-rake+receiver such a sufficient statistics is available after interference whitening as discussed further below.

A mathematical back transformation technique is applied, allowing the interference to be expressed using the signal to interference ratio that is anyway estimated in the baseband. This reduces the baseband estimation needs to the own user "performance metric" power, avoiding the need to estimate the interference, as seen by each user after interference whitening processing. This results in a very low computational complexity. A compensation factor computation is also performed, for scaling of the thermal noise power floor to the "sufficient statistics" signal point, said thermal noise power floor being estimated with prior art techniques. This compensation factor computation is also of low computational complexity.

Figure 6:
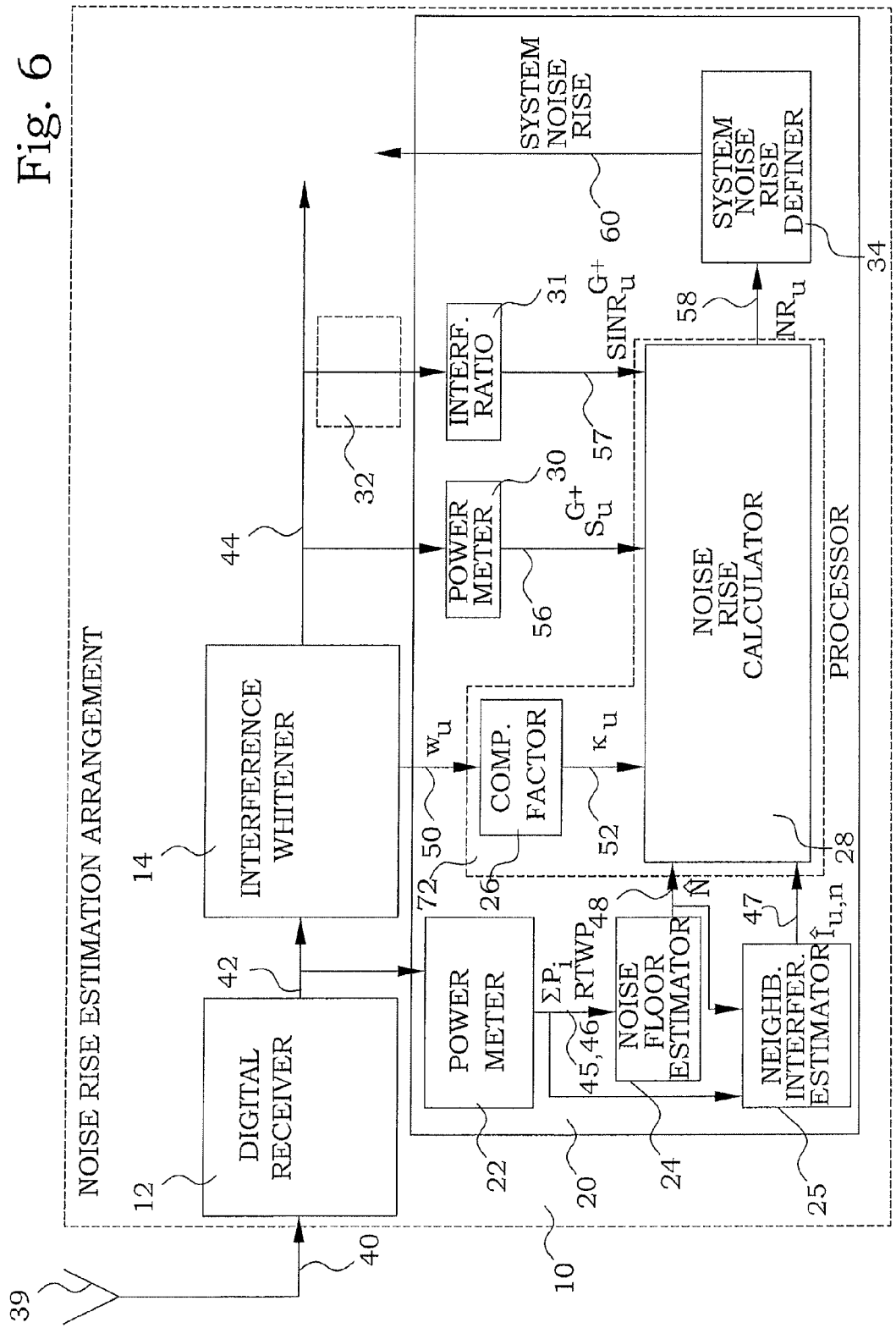
FIG. 6 is a block scheme of an embodiment of a noise rise estimation arrangement according to the present invention.

An embodiment of an arrangement 10 for noise rise estimation in a wireless communication system is schematically illustrated in FIG. 6. The arrangement 10 for noise rise estimation comprises a digital receiver 12, an interference whitener 14 and a processor 20. The interference whitener 14 is connected to the digital receiver 12 for receiving digital signals therefrom. The interference whitener 14 is generally based on one of GRAKE, GRAKE+ and the chip equalizer, and in this particular embodiment on GRAKE+. The interference whitener 14 is intended for providing interference whitening for a plurality of users at an output, providing interference whitened digital signals 44.

The processor 20 is connected to the digital receiver 12 and to the output from the interference whitener 14. The processor 20 has a power meter 22, arranged for measuring received total wideband power 46 of the signals 42 received at the digital receiver 12 a plurality of times. These measured received total wideband powers 46 are provided at an output from the power meter 22. The power meter 22 is further arranged for generating a measure of an own cell power 45 a plurality of times. Also these generated measures of an own cell power 45 are provided at an output from the power meter 22.

The processor 20 has further a noise floor estimator 24 connected to the output of the power meter 22. The noise floor estimator 24 is arranged for computing an estimate of a noise floor measure $\hat{N}$ 48 based on at least a number of the measured received total wideband powers 46 and generated measures of an own cell power 45.

In addition to the noise floor estimator 24, the processor 20 has a neighbour interference estimator 25 connected to the output of the power meter 22 and to the noise floor estimator 24. The neighbour interference estimator 25 is configured to compute an estimate of a neighbour cell interference power for individual ones of the plurality of users based on at least a number of the measured received total wideband powers and generated measures of an own cell power.

In the present embodiment, the processor also comprises a second power meter 30 that is connected to be responsive to interference whitened digital signals 44 output from the interference whitener 14. In this second power meter 30, a useful signal power $S_u^{G+}$ 56 for each user of the plurality of users is determined as defined after the interference whitening.

The processor 20 is further arranged for calculating a noise rise measure for individual users, taking the effect of the interference whitening into account. For this task a number of input factors are needed. During the interference whitening process, combining weights $w_u$ are obtained, see e.g. equation (1). These combining weights $w_u$ 50 are supplied to a compensation factor calculating section 26 of the processor 20. As will be described more in detail further below, a noise floor compensation factor $\kappa_u$ 52 for a user u is preferably derived as the product of a conjugate transpose of the combining weights $w_u$ 50 and the combining weights $w_u$ 50 themselves if an approximation for white noise power floor can be accepted. This is the case in the illustrated embodiment. Alternatively, if a coloured noise power floor has to be taken into account, the noise floor compensation factor $\kappa_u$ 52 for the user u is derived as the trace of the product of a conjugate transpose of the combining weights $w_u$ 50, a thermal noise covariance matrix representing the correlation due to the spectral shape of the whole wideband channel and the combining weights $w_u$ 50 themselves divided by the trace of the covariance matrix. The thermal noise covariance matrix representing the correlation due to the spectral shape of the whole wideband channel is also obtainable from the interference whitening process.

The processor 20 of the present embodiment also comprises an interference ratio measure obtaining section 31. This interference ratio measure obtaining section 31 is arranged for obtaining a measure of a code power to interference ratio. 2. The code power to interference ratio measure is preferably C/I or SINR, and in the present embodiment a $SINR_u^{G+}$ measure 57 is used. As explained further below, a C/I measure can be converted into a SINR measure and vice versa. In many applications, the SINR is already calculated elsewhere in the receiver system, and in such alternative embodiments, the actual interference ratio measure is deduced in an external section, as indicated by the broken line box 32, and the interference ratio measure obtaining section 31 is then merely reduced to a means adapted to receive information about such measure.

The processor 20 further comprises a noise rise calculator 28. In this noise rise calculator 28 a noise rise measure $NR_u$ for a specific user u is calculated based at least on the useful signal power $S_u^{G+}$ 56 for the concerned user after interference whitening, the concerned user noise floor compensation factor $\kappa_u$ 52, the code power to interference ratio measure $SINR_u^{G+}$ 57 for the concerned user, the estimated neighbour cell interference $\hat{I}_{u,u}$ power 47 and the noise floor measure $\hat{N}$ 48. Consequently, the noise rise calculator 28 is thereby connected to the compensation factor calculating section 26, the second power meter 30 and the interference ratio measure obtaining section 31, and of course to the noise floor estimator 24 and neighbour interference estimator 25. The compensation factor calculating section 26 is preferably integrated together with the noise rise calculator 28, forming a load estimator 72. As will be explained more in detail below, the noise rise measure $NR_u$ for a first user u is preferably calculated as the useful signal power $S_u^{G+}$ 56 for the first user after interference whitening divided by the product of the user noise floor compensation factor $\kappa_u$ 52 and the noise floor measure $\hat{N}$ 48 and multiplied with a factor depending on the inverse of the code power to interference ratio measure $SINR_u^{G+}$ 57 for the first user.

In this embodiment, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

In this embodiment, the arrangement 10 for noise rise estimation is further arranged for defining a system noise rise measure. The processor 20 is thereby arranged for repeating the operations for achieving a user specific noise rise measure for a plurality of users. The processor 20 further comprises a system noise rise definer 34, connected to the noise rise calculator 32. The system noise rise definer 34 is arranged for defining a system noise rise measure 60 based on the noise rise measures 58 for the plurality of users. Details of preferred procedures to achieve the system noise rise measure 60 are presented further below.

The noise rise estimation arrangement 10 is in a typical embodiment provided in a load scheduler of a wireless communication system. Such a load scheduler is preferably configured to schedule uplink load in the wireless communication system based on the estimated noise rise measure. The load scheduler and/or the noise rise estimation arrangement 10 are typically comprised in a base station of a wireless communication system, e.g. as illustrated in FIG. 1.

Figure 7:
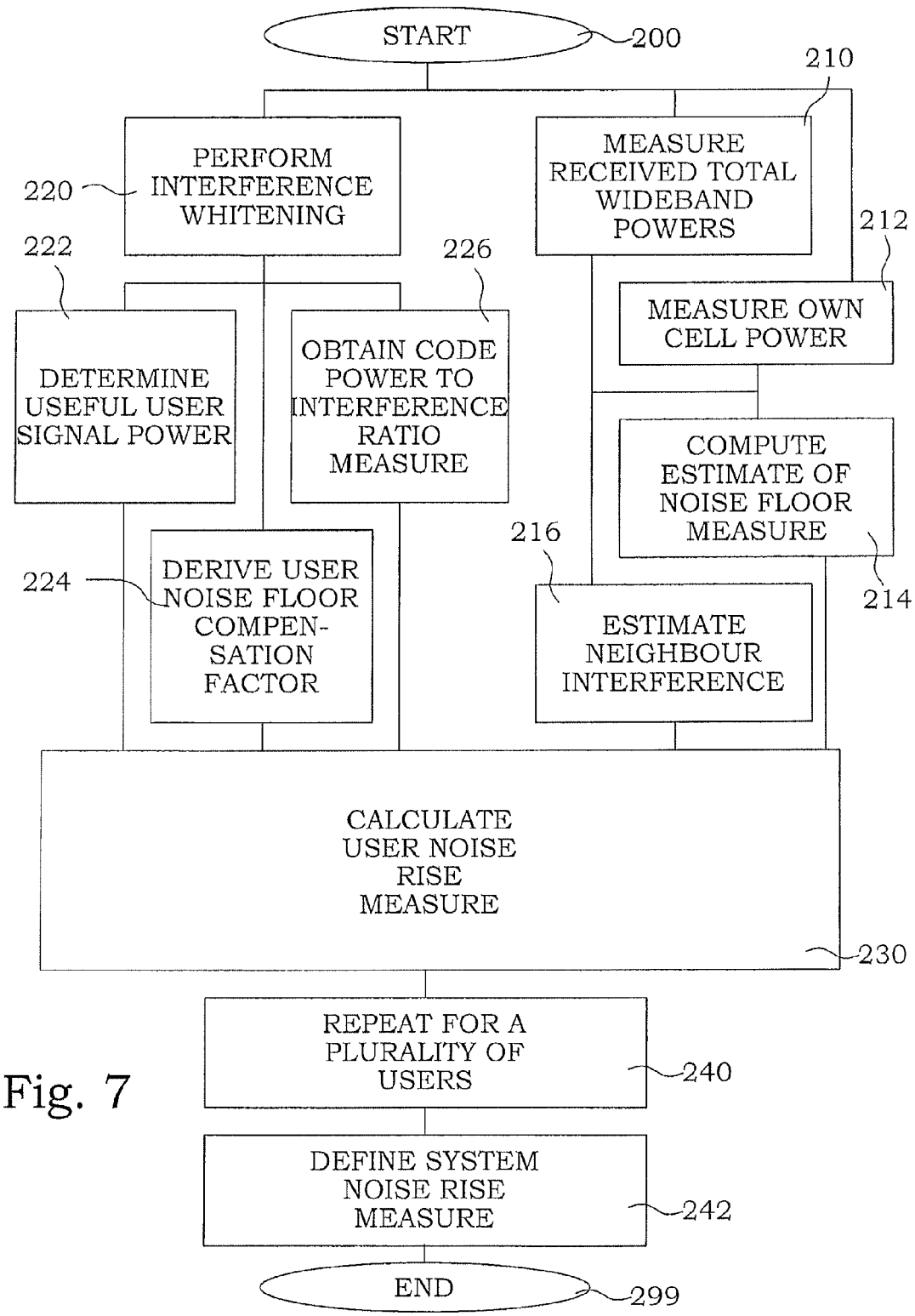
FIG. 7 is a flow diagram of an embodiment of a method according to the present invention.

In FIG. 7, a flow diagram of an embodiment of a method according to the present invention is illustrated. The method for noise rise estimation in a wireless communication system begins in step 200. In step 210, received total wideband power is measured a plurality of times. In step 212, a measure of an own cell power is generated a plurality of times. An estimate of a noise floor measure is computed in step 214 based on at least a number of the measured received total wideband powers and generated measures of an own cell power. A neighbour cell interference power for a first user is estimated in step 216, based on at least a number of the measured received total wideband powers and generated measures of an own cell power.

In step 220, an interference whitening is performed based on one of the techniques GRAKE, GRAKE+ and chip equalizer for at least a first user. Step 220 can be performed before, after or partially or entirely concurrent to any of the steps 210 to 216. In step 222, a useful signal power for at least the first user after interference whitening is determined.

In step 224, which can be performed independently of step 222, a user noise floor compensation factor for at least the first user is derived based on combining weights for the respective user used during the interference whitening. In one embodiment, the first user noise floor compensation factor is derived as the product of a conjugate transpose of the combining weights and the combining weights themselves. This is preferred as an approximation for a white noise power floor. In another embodiment, the first user noise floor compensation factor is derived as the trace of the product of a conjugate transpose of the combining weights, a thermal noise covariance matrix representing the correlation due to the spectral shape of the whole wideband channel and the combining weights divided by the trace of the covariance matrix. This is preferred as an approximation for a coloured noise power floor.

A code power to interference ratio measure for at least the first user is obtained in step 226. The code power to interference ratio measure is preferably C/I or SINR.

In step 230, a noise rise measure for the first user is calculated based at least on the useful signal power for the first user after interference whitening, the first user noise floor compensation factor, the code power to interference ratio measure for the first user, the estimated neighbour cell interference power and the noise floor measure. Preferably, the noise rise measure for the first user is calculated as the RoT of the first user minus a ratio between the neighbour cell interference and the noise floor measure. The RoT is in turn calculated as the useful signal power for the first user after interference whitening divided by the product of the user noise floor compensation factor and the noise floor measure and multiplied with a factor depending on the inverse of the code power to interference ratio measure for the first user.

In step 240, the previous user specific steps of performing 220, determining 222, deriving 224, obtaining 226 and calculating 230 are repeated for a plurality of users. A system noise rise measure is defined in step 242 based on the noise rise measures for the plurality of users. In one embodiment, the system noise rise measure is defined as a maximum noise rise measure of the noise rise measures for the plurality of users. In another embodiment, the system noise rise measure is defined as an average noise rise measure of the noise rise measures for the plurality of users. In yet another embodiment, the system noise rise measure is defined as corresponding to a pre-selected percentile of the noise rise measures for the plurality of users.

The procedure ends in step 299.

The procedure of FIG. 7 is typically part of a method for load scheduling in a wireless communication system. Besides the estimating of a noise rise measure, the method further comprises scheduling of uplink load in the wireless communication system based on the estimated noise rise measure.

A detailed embodiment based on GRAKE+ of the present invention is here below presented in more mathematical terms.

Measurement of Load after IC in Grake+ and Chip Equalizers

To see how load can be estimated taking account of the GRAKE+ IC gain, the powers after weight combining are studied at sufficient statistics level. First, it is assumed that the received signal of user u on code $k \in \Omega_u$ is $$y_{u,k} = h_u s_{u,k} + I_{u,k} + N_{u,k}, \quad u=1,\ldots,U, k=1,\ldots,K \quad (7)$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. GRAKE+ then performs weight combining to get the sufficient statistics $z_{u,k}^{G+}$ according to the equations:

$$\hat{z}_{u,k}^{G+} = \hat{w}_u^H y_{u,k} = \hat{w}_u^H \hat{h}_u s_{u,k} + \hat{w}_u^H N_{u,k}, \quad u=1,\ldots,U,$$
$$k=1,\ldots,K. \quad (8)$$

$$\hat{R}_u \hat{w}_u = \hat{h}_u, \quad u=1,\ldots,U \quad (9)$$

Here $\hat{w}_u$ are the combining weights of GRAKE+, whereas the estimated covariance matrix that models the interference for computation of the combining weights for the users u is given by $\hat{R}_u$. Equations (8) and (9) have two main implications; one indicating how power measurements can be done and one indicating the scale factor problem which is addressed below.

Using equation (8) it can be seen that the effect of the GRAKE+ weight combining is the same as if an artificial received signal $z_{u,k}^{G+}$ would be processed. Since these signals obviously reflect the weight combining and thereby the IC gains of the GRAKE+ receiver, $z_{u,k}^{G+}$, u=1, ..., U, k=1, ..., K, is believed to be a relevant starting point for load estimation.

As stated above, the load estimator operates by processing of the RTWP and preferably also the RSEPS. For this reason, similar power signals need to be formed from the $z_{u,k}^{G+}$, u=1, ..., U, k=1, ..., K, in order to reuse the load concept applied without IC. It is presently not totally clear if the proposed approach to reuse the load concept applied without IC is precise or optimal.

The received scheduled enhanced uplink power (RSEPS) in fact constitutes a part of the above mentioned sum of code powers $$\sum_{i=1}^{n} P_i^{Code}(t).$$

In a mathematical way it can be expressed as:

$$\sum_{i=1}^{n} P_i^{Code}(t) = RSEPS + P^{Voice} \quad (10)$$

where $P^{Voice}$ represents transmissions not using enhanced uplink facilities, and comprises to a large part "normal" voice transmissions. The enhanced uplink transmissions may have properties of high and even load on the transmission power. At the contrary, voice transmissions are typically instead very bursty in their nature. Even at high voice transmission loads, there are instances, where the instantaneous contribution to the total power of a cell is low.

The reason why RSEPS is useful and referred to here is that it is power that lumps all the measured scheduled EUL power in one measurement report. It is of course based on individual code power measurements. The reason why it is central is that the RNC can use it for admission control since RSEPS is signalled over Iub. When GRAKE+ is available it would be the RSEPS experienced after GRAKE+ processing that would be the interesting quantity for admission control.

User Powers Associated with the GRAKE+ Sufficient Statistics

Squaring (8) and assuming a low degree of correlation between its three terms, leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u^H N_{u,k}$$
$$N_{u,k}^H \hat{w}_u^H \hat{w}_u \equiv S_{u,k}^{G+} + I_{u,k}^{G+} + N_{u,k}^{G+}, \quad u=1,\ldots,U,$$
$$k=1,\ldots,K. \quad (11)$$

Here, $S_{u,k}^{G+}$ is the useful code signal power for the user u after interference whitening, $I_{u,k}^{G+}$ is the code interference signal power for the user u after interference whitening and $N_{u,k}^{G+}$ is the code noise floor power for the user u after interference whitening.

The rise over thermal (2), as seen by user u is now, by definition $$RoT_u^{G+} \equiv \frac{S_u^{G+} + I_u^{G+} + N_u^{G+}}{N_u^{G+}} \quad (12)$$

$$S_u^{G+} = \sum_{k \in \Omega_u} S_{u,k}^{G+} \quad (13)$$

$$I_u^{G+} = \sum_k I_{u,k}^{G+} \quad (14)$$

$$N_u^{G+} = \sum_k N_{u,k}^{G+}. \quad (15)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (11) $S_{u,k}^{G+} = \hat{w}_u^H \hat{h}_u \hat{w}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (11)-(15).

Computation of The Useful Signal Power

The signal power is computed directly from (13). Using (11) and (13) then results in:

$$S_u^{G+} = \quad (16)$$

$$\sum_{k \in \Omega_u} S_{u,k}^{G+} = \hat{w}_u^H \hat{h}_u \hat{h}_u^H \hat{w}_u \sum_{k \in \Omega_u} |s_{u,k}|^2 = \hat{w}_u^H \hat{h}_u \hat{h}_u^H \hat{w}_u \hat{E}_{s,u} = |\hat{w}_u^H \hat{h}_u|^2 \hat{E}_{s,u},$$

$$u = 1, \ldots, U.$$

Note that computation of the signal energy $\hat{E}_{s,u}$ is quite intricate, including e.g. the involved beta factors.

Computation of the Noise Floor Power

White Noise Power Floor

The idea here is to rely on the thermal noise power floor estimation algorithm used in prior art methods, to estimate the thermal noise power floor before any GRAKE+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the compensation factor by which the thermal noise power is scaled. To compute this quantity, first note that when the wideband thermal noise power floor is estimated before GRAKE+ processing, the following quantity is estimated $$\hat{N} = \frac{1}{M}\sum_{m=1}^{M}\sum_{k=1}^{K}(N_{u,k}^m)^H N_{u,k}^m \xrightarrow[M\to\infty]{} KE[(N_{u,k})^H N_{u,k}] = \quad (17)$$

$$KP_{N_{u,k}} = K\frac{1}{K}P_N = N_0,$$

where $N_0$ is the thermal noise power floor, and where m indexes time. The power at the sufficient statistics signal processing point is however:

$$\hat{N}^{G+} = \frac{1}{M}\sum_{m=1}^{M}\sum_{k=1}^{K}(\hat{w}_u^H N_{u,k}^m)^H \hat{w}_u^H N_{u,k}^m \quad (18)$$

$$= \frac{1}{M}\sum_{m=1}^{M}\sum_{k=1}^{K} tr\big((\hat{w}_u^H N_{u,k}^m)^H \hat{w}_u^H N_{u,k}^m\big)$$

$$= \frac{1}{M}\sum_{m=1}^{M}\sum_{k=1}^{K} tr\big(\hat{w}_u^H N_{u,k}^m (\hat{w}_u^H N_{u,k}^m)^H\big)$$

$$= \frac{1}{M}\sum_{m=1}^{M}\sum_{k=1}^{K} tr\big(\hat{w}_u^H N_{u,k}^m (N_{u,k}^m)^H \hat{w}_u\big)$$

$$= tr\left(\sum_{k=1}^{K}\hat{w}_u^H \left(\frac{1}{M}\sum_{m=1}^{M} N_{u,k}^m (N_{u,k}^m)^H\right)\hat{w}_u\right) \xrightarrow[M\to\infty]{}$$

$$tr\big(K\hat{w}_u^H E[N_{u,k}(N_{u,k})^H]\hat{w}_u\big)$$

$$= tr\big(K\hat{w}_u^H (N_0/K)I \hat{w}_u\big) = \hat{w}_u^H \hat{w}_u N_0 = \hat{w}_u^H \hat{w}_u \hat{N}.$$

The conclusion is that the thermal noise floor at the sufficient statistics signal point can be obtained from the noise floor estimate before GRAKE+ processing, by a multiplication with the compensation factor:

$$\kappa_u^{G+} = (\hat{w}_u)^H \hat{w}_u, u=1,\ldots,U. \quad (19)$$

This gives:

$$N_u^{G+} = \kappa_u^{G+}\hat{N}, u=1,\ldots,U. \quad (20)$$

The computation of the compensation factor only requires an additional inner product for each user.

Coloured Noise Power Floor

This subsection discusses the case where the result of (17) is replaced by the more general assumption:

$$\frac{1}{M}\sum_{m=1}^{M}\sum_{k=1}^{K} N_{u,k}^m (N_{u,k}^m)^H \xrightarrow[M\to\infty]{} KE[N_{u,k}(N_{u,k})^H] = K\frac{N_0}{K}R_N = N_0 = R_N, \quad (21)$$

i.e. the case when sampling is fast enough to reflect the shape of the uplink spectrum. In this case it follows that (17) is transformed to:

$$\hat{N} = \frac{1}{M}\sum_{m=1}^{M}\sum_{k=1}^{K}(N_{u,k}^m)^H N_{u,k}^m \xrightarrow[M\to\infty]{} KE[(N_{u,k})^H N_{u,k}] = \quad (22)$$

$$Ktr(E[N_{u,k}(N_{u,k})^H]) = N_0 tr(R_N).$$

Furthermore, (18) is transformed into $$\hat{N}^{G+} = N_0 tr(\hat{w}_u^H R_N \hat{w}_u). \quad (23)$$

The end result in this case is the compensation factor:

$$\kappa_u^{G+} = \frac{tr(\hat{w}_u^H R_N \hat{w}_u)}{tr(R_N)}. \quad (24)$$

Computation of Interference Signal Power Using Available SINRs

In the possible implementation in baseband, the code power to interference ratio is:

$$(C/I)_u^{G+} = \frac{S_u^{G+}}{I_u^{G+} + N_u^{G+}}, u=1,\ldots,U. \quad (25)$$

It can be noted that in (25), all quantities except $I_u^{G+}$ have already been computed, see (18) and (20). Using these quantities, (25) can be solved for $I_u^{G+}$, giving:

$$I_u^{G+} = \frac{S_u^{G+}}{(C/I)_u^{G+}} - \kappa_u^{G+}\hat{N}, u=1,\ldots,U. \quad (26)$$

In the baseband processing, the $(C/I)_u^{G+}$ quantity is typically not directly available. It can however be directly related to SINR which is estimated in the baseband. This is performed as:

$$(C/I)_u^{G+} = \frac{(\beta_{u,EDPCCH}^2 + \beta_{u,DPDCH}^2 + n_{u,codes}\beta_{u,EDPDCH}^2)}{\beta_{u,EDPCCH}^2 SF_{u,EDPCCH}} SINR_u^{G+} = \quad (27)$$

$$\frac{\beta_{u,effective}^2}{SF_{u,EDPCCH}} SINR_u^{G+}$$

which gives:

$$I_u^{G+} = \frac{S_u^{G+}}{(C/I)_u^{G+}} - \kappa_u^{G+}\hat{N} = \frac{SF_{u,EDPCCH}}{\beta_{u,effective}^2}\frac{S_u^{G+}}{SINR_u^{G+}} - \kappa_u^{G+}\hat{N}. \quad (28)$$

SINR is defined as (27). It is understood by anyone skilled in the art that also other code power to interference ratio measures can be used to calculate C/I and/or SINR in order to provide a similar quantity.

Computation of Rise Over Thermal

When (16), (20) and (28) are inserted in (12), the end result becomes:

$$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right), \quad (29)$$

$$u=1,\ldots,U.$$

These measures, for each user, are then combined into an uplink measure as outlined below.

Note that (29) provides some insights. When SINR is high, then the RoT for the user is essentially determined by the remaining own power of the user—the RoT then increases when the SINR gets worse.

Computation of RTWP and RSEPS Equivalents

The computation of the equivalent of RTWP and RSEPS power, at the sufficient statistics signal point, is discussed next. It follows from (29) that the equivalent of RTWP, seen by user u, becomes $$S_{u,RTWP}^{G+} = S_u^{G+}\left(1 + \frac{SF_{u,EDPCCH}}{\beta_{u,effective}^2} \frac{1}{SINR_u^{G+}}\right), u = 1, \ldots, U. \quad (30)$$

The equivalent of RSEPS, as seen by user u, is therefore obtained by a summation over the RSEPS user codes, when still using $\hat{h}_u$ and $\hat{w}_u$:

$$S_{u,RSEPS}^{G+} = \sum_{u_{RSEPS}=1}^{U_{RSEPS}} S_{u(u_{RSEPS})}^{G+}, u = 1, \ldots, U \quad (31)$$

$$S_{u(u_{RSEPS})}^{G+} = \sum_{k \in \Omega_{u(u_{RSEPS})}} S_{u,k}^{G+} = \hat{w}_u^H \hat{h}_u \hat{h}_u^H \hat{w}_u \sum_{k \in \Omega_{u(u_{RSEPS})}} |s_{u,k}|^2 \quad (32)$$

$$= \hat{w}_u^H \hat{h}_u \hat{h}_u^H \hat{w}_u \hat{E}_{s,u(u_{RSPES})} = |\hat{w}_u^H \hat{h}_u|^2 \hat{E}_{s,u(u_{RSEPS})}, u_{RSEPS} = 1, \ldots, U_{RSEPS}.$$

Note again that the channel model of user u is retained when summing over the codes of the RSEPS users. Hence the computation needs to be performed once for each user.

Neighbour Cell Interference Estimation

As discussed further above, in order to obtain a noise rise measure suitable for stability purposes, the neighbour cell interference can be subtracted from the RoT of (29), to yield $$NR_u^{G+} \equiv \frac{S_u^{G+} + I_u^{G+} + \kappa_u^{G+}\hat{N} - I_{u,neighbor}^{G+}}{\kappa_u^{G+}\hat{N}}, u = 1, \ldots, U \quad (33)$$

This load measure is valid for each user, after GRAKE+ processing.

In order to come up with an estimate of the neighbour cell interference after GRAKE+ processing ($I_{u,neighbor}^{G+}$) two simplifying assumptions are necessary.

The first assumption is that the own cell interference dominates over the neighbour cell interference. This assumption is surely not always true. However, it is when the own cell interference dominates that stability of the own cell is most at stake—hence the case with dominating neighbour cell interference is less relevant from a stability point of view. Furthermore, the proposed new noise rise measure (33) is not going to be used alone. The RoT measure (29) is normally used in parallel, capturing the case of dominating neighbour cell interference.

The second assumption is that the neighbour cell interference can be treated as generated by a white noise process.

Using these assumptions the neighbour cell interference can be treated as the thermal noise power floor, resulting in:

$$\hat{I}_{u,neighbor}^{G+} = \frac{1}{M} \sum_{m=1}^{M} \sum_{k=1}^{K} \left(\hat{w}_u^H I_{u,neighbor,k}^m\right)^H \hat{w}_u^H I_{u,neighbor,k}^m \quad (34)$$

$$= \frac{1}{M} \sum_{m=1}^{M} \sum_{k=1}^{K} tr\left(\left(\hat{w}_u^H I_{u,neighbor,k}^m\right)^H \hat{w}_u^H I_{u,neighbor,k}^m\right)$$

$$= \frac{1}{M} \sum_{m=1}^{M} \sum_{k=1}^{K} tr\left(\hat{w}_u^H I_{u,neighbor,k}^m \left(\hat{w}_u^H I_{u,neighbor,k}^m\right)^H\right)$$

$$= \frac{1}{M} \sum_{m=1}^{M} \sum_{k=1}^{K} tr\left(\hat{w}_u^H I_{u,neighbor,k}^m (I_{u,neighbor,k}^H)^H \hat{w}_u\right)$$

$$= tr\left(\sum_{k=1}^{K} \hat{w}_u^H \left(\frac{1}{M}\sum_{m=1}^{M} I_{u,neighbor,k}^m (I_{u,neighbor,k}^m)^H\right) \hat{w}_u\right) \xrightarrow[M\to\infty]{} tr\left(\hat{w}_u^H E[I_{u,neighbor}(I_{u,neighbor})^H]\hat{w}_u\right)$$

$$= tr\left(\hat{w}_u^H (\hat{I}_{u,neighbor})I\hat{w}_u\right) = \hat{w}_u^H \hat{w}_u \hat{I}_{u,neighbor}.$$

This gives:

$$I_{u,neighbor}{}^{G+} = \kappa_u{}^{G+}\hat{I}_{u,neighbor}, \quad u=1,\ldots,U. \tag{35}$$

where $\hat{I}_{u,neighbor}{}^{G+}$ is the neighbour cell interference power as estimated before GRAKE+ processing, i.e. at the same signal point as where $\hat{N}$ is estimated. Note that normally the neighbour cell interference is lower than the own cell interference, therefore the approximations associated with the neighbour cell interference have less impact on the final result than what the corresponding assumptions on the own cell interference would have.

This means that the neighbour cell interference may be estimated before GRAKE+ processing followed by a scaling to achieve a neighbour cell interference value after GRAKE+ processing.

One set of means that allows for neighbour cell interference estimation before GRAKE+ processing has e.g. been defined in WO 2007/024166, where a quantity representing a sum of neighbour cell interference (and any external power) and thermal noise power is obtained. Since the noise power floor is also estimated it follows that an estimate of the neighbour cell interference can be made available as a difference between these two estimations before GRAKE+ processing. Note that the solution in WO 2007/024166 requires that a RAKE receiver for each user is used as well, in order to obtain a measure of all own cell user powers.

Another set of means that would allows for neighbour cell interference estimation before GRAKE+ processing would build on WO 2007/024166, where a quantity representing a sum of neighbour cell interference and thermal noise power is obtained. However, rather than using the measured powers before GRAKE+ processing in a standard RAKE receiver to achieve the estimation goal, the sum of the computed load factors for the own cell channels would be used. Since the noise power is also estimated it follows that an estimate of the neighbour cell interference can be made available before GRAKE+ processing. This approach has the advantage that no prior RAKE receiver processing would be needed, rather the neighbour cell interference estimation would draw on information from other parts of the load estimator. In detail, this approach would start with the total load factor for the own cell, then use (5) to solve for the C/I from which (cf. (25)) the power S of the own cell can be computed from the measured RTWP a using the relation:

$$(C/I) = \frac{S}{RTWP - S} \tag{36}$$

The Cell Stability Load Measure for a User after GRAKE+ Interference Whitening
Using (30), (33) and (34) results in $$NR_u^{G+} = \frac{S_u^{G+} + I_u^{G+} + \kappa_u^{G+}\hat{N} - I_{u,neighbor}^{G+}}{\kappa_u^{G+}\hat{N}} \tag{37}$$

$$= \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{u,neighbor}}{\hat{N}}$$

$$= \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{neighbor}}{\hat{N}}$$

since before GRAKE+ processing the neighbour cell interference is independent of the user.

Combined Cell Stability Measures after GRAKE+ Interference Whitening
Average Cell Stability Load Measure
Averaging over all users using (35), gives the uplink load measure $$\langle NR^{G+}\rangle = \frac{1}{U}\sum_{u=1}^{U} NR_u^{G+}. \tag{38}$$

Worst Case Cell Stability Load Measure
Rather than performing averaging a worst case approach may therefore be taken, where the averaging is replaced by a maximum operation. This means that the user that sees the maximum total load is used for load estimation purposes. This conservative approach could hence be motivated by cell stability arguments—however it may also be too conservative. The worst case load is defined by the equations:

$$u_{max} = \arg\max_u(NR_u^{G+}) \tag{39}$$

$$\max(NR_u{}^{G+}) = NR_{u_{max}}{}^{G+} \tag{40}$$

Today, it is common practice to implement the computationally most intense parts of the WCDMA uplink radio receivers on application specific integrated circuits (ASICs). Typically, such ASICs provides RAKE, GRAKE or GRAKE+ receiver processing for a multitude of users, using dedicated parallel hardware. It is e.g. previously known to implement channel estimation, weight combining, demodulation and decoding on such ASICS, for multiple users. To achieve this, the ASICS may be equipped with dedicated accelerators e.g. for TURBO decoding, matrix operations and similar. This is facilitated by the fact that ASICS can be programmed to perform different tasks, exploiting a variety of such hardware accelerator resources. To our knowledge, prior to the present invention, dedicated processing means for load estimation has however not been implemented on ASICS.

In a preferred embodiment of an arrangement for noise rise estimation in a wireless communication system, at least a part of the functionality of the processor as illustrated in FIG. 6 is implemented by at least one of an Application Specific Integrated Circuit (ASIC) and a Digital Signal Processor (DSP).

The embodiment presents ASIC implementation of at least a subset of the above described functionality.

Note that scale factor errors of the order of 1 dB occur between antenna branches. Unless a separate estimation of noise power floors are used, the consequence is that a too large margin may be needed in the scheduler. This follows since the dominating antenna channel (the one with the highest scale factor) would also dominate the noise floor estimation. Hence, the noise rise would be underestimated for the channel with the lowest scale factor, something that opens up for reduced stability margins via the antenna branch with the lowest actual scale factor. The ASIC should hence also preferably allow for functionality that distinguishes between different analogue signal paths.

The invention discloses techniques that allow for load estimation that reflects the interference whitening gains of GRAKE+ and similar techniques and a new noise rise measure, thus enhancing cell throughput at system level. The new noise rise measure directly addresses the channel powers that are subject to fast inner loop power control. Without the disclosed invention, large parts of the link gains associated with GRAKE+ would not materialize, due to the need to use too conservative margins. The applied back transformation reduces the computational complexity considerably, allowing a computation of the load only using inner products.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

ASIC—Application Specific Integrated Circuit
C/I—Code power to Interference ratio
DSP—Digital Signal Processor
EUL—Enhanced UpLink
GRAKE—Generalized RAKE
IC—Interference Cancellation
RBS—Radio Base Station
RoT—Rise over Theimal
RSEPS—Received Scheduled Enhanced dedicated channel Power Share
RTWP—Received Total Wideband Power
SIC—Successive Interference Cancellation
SINR—Signal to Interference and Noise Ratio
SIR—Signal to Interference Ratio
UE—User Equipment
WCDMA—Wideband Code Division Multiple Access

The invention claimed is:

1. A method for noise rise estimation in a wireless communication system, said method comprising:
  measuring received total wideband power a plurality of times;
  generating a measure of an own cell power a plurality of times;
  computing an estimate of a noise floor measure based on at least a number of said measured received total wideband powers and said generated measures of an own cell power;
  estimating a neighbour cell interference power for a first user based on at least a number of said measured received total wideband powers and said generated measures of an own cell power;
  performing an interference whitening based on one of GRAKE and chip equalization, for said first user;
  determining a useful signal power for said first user after interference whitening;
  deriving a first user noise floor compensation factor based on combining weights used for said first user in said interference whitening;
  obtaining a code power to interference ratio measure for said first user; and
  calculating a noise rise measure for said first user, based at least on said useful signal power for said first user after interference whitening, said first user noise floor compensation factor, said code power to interference ratio measure for said first user, said noise floor measure and said estimated neighbour cell interference power.

2. The method according to claim 1, further comprising:
  repeating of said steps of estimating, performing, determining, deriving, obtaining and calculating for a plurality of users; and
  defining a system noise rise measure based on said noise rise measures for said plurality of users.

3. The method according to claim 2, wherein said system noise rise measure is defined as a maximum noise rise measure of said noise rise measures for said plurality of users.

4. The method according to claim 2, wherein said system noise rise measure is defined as an average noise rise measure of said noise rise measures for said plurality of users.

5. The method according to claim 1, wherein said code power to interference ratio measure is selected from one of a carrier-to-interference (C/I) ratio and a signal-to-interference-and-noise ratio (SINR).

6. The method according to claim 1, wherein said first user noise floor compensation factor is derived as an approximation of a white noise power floor, based on the product of a conjugate transpose of said combining weights and said combining weights.

7. The method according to claim 1, wherein said first user noise floor compensation factor is derived as an approximation of a coloured noise floor, based on the trace of the product of a conjugate transpose of said combining weights, a thermal noise covariance matrix representing the correlation due to the spectral shape of the whole wideband channel, and said combining weights divided by the trace of said thermal noise covariance matrix.

8. The method according to claim 6, wherein said noise rise measure for said first user is calculated as said useful signal power for said first user after interference whitening divided by the product of the said user noise floor compensation factor and said noise floor measure and multiplied with a factor depending on the inverse of the code power to interference ratio measure for said first user subtracted by a ratio between said estimated neighbour cell interference power and said noise floor measure.

9. A method for load scheduling in a wireless communication system, said method comprising:
  estimating a noise rise measure by:
    measuring received total wideband power a plurality of times;
    generating a measure of an own cell power a plurality of times;

computing an estimate of a noise floor measure based on at least a number of said measured received total wideband powers and said generated measures of an own cell power;

estimating a neighbour cell interference power for a first user based on at least a number of said measured received total wideband powers and said generated measures of an own cell power;

performing an interference whitening based on one of GRAKE and chip equalization, for said first user;

determining a useful signal power for said first user after interference whitening;

deriving a first user noise floor compensation factor based on combining weights used for said first user in said interference whitening;

obtaining a code power to interference ratio measure for said first user; and calculating a noise rise measure for said first user, based at least on said useful signal power for said first user after interference whitening, said first user noise floor compensation factor, said code power to interference ratio measure for said first user, said noise floor measure and said estimated neighbour cell interference power; and scheduling uplink load in said wireless communication system based on said estimated noise rise measure.

10. An arrangement for noise rise estimation in a wireless communication system, said arrangement comprising:
a digital receiver to receive signals from a plurality of users;
an interference whitener connected to said digital receiver, wherein the interference whitener is based on one of GRAKE and chip equalization, and is configured to provide interference whitening for said plurality of users at an output; and
a processor connected to said digital receiver and to said output from said interference whitener, wherein the processor is configured to:
measure received total wideband power received at said digital receiver a plurality of times;
generate a measure of an own cell power a plurality of times;
compute an estimate of a noise floor measure based on at least a number of said measured received total wideband powers and said generated measures of an own cell power;
compute an estimate of a neighbour cell interference power for individual ones of said plurality of users based on at least a number of said measured received total wideband powers and said generated measures of an own cell power;
determine a useful signal power for a first user of said plurality of users after interference whitening;
derive a first user noise floor compensation factor based on combining weights used for said first user in said interference whitening;
obtain a code power to interference ratio measure for said first user; and
calculate a noise rise measure for said first user, based at least on said useful signal power for said first user after interference whitening, said first user noise floor compensation factor, said code power to interference ratio measure for said first user, said noise floor measure and said estimated neighbour cell interference power.

11. The arrangement according to claim 10, wherein said processor is further configured to repeat said estimating, performing, determining, deriving, obtaining and calculating for said plurality of users, and to define a system noise rise measure based on said noise rise measures for said plurality of users.

12. The arrangement according to claim 10, wherein at least said processor is implemented by at least one of an application specific integrated circuit and a digital signal processor.

13. A load scheduler of a wireless communication system comprising:
an arrangement for noise rise estimation, said arrangement comprising:
a digital receiver to receive signals from a plurality of users;
an interference whitener connected to said digital receiver, wherein the interference whitener is based on one of GRAKE and chip equalization, and is configured to provide interference whitening for said plurality of users at an output; and
a processor connected to said digital receiver and to said output from said interference whitener, wherein the processor is configured to:
measure received total wideband power received at said digital receiver a plurality of times;
generate a measure of an own cell power a plurality of times;
compute an estimate of a noise floor measure based on at least a number of said measured received total wideband powers and said generated measures of an own cell power;
compute an estimate of a neighbour cell interference power for individual ones of said plurality of users based on at least a number of said measured received total wideband powers and said generated measures of an own cell power;
determine a useful signal power for a first user of said plurality of users after interference whitening;
derive a first user noise floor compensation factor based on combining weights used for said first user in said interference whitening;
obtain a code power to interference ratio measure for said first user; and
calculate a noise rise measure for said first user, based at least on said useful signal power for said first user after interference whitening, said first user noise floor compensation factor, said code power to interference ratio measure for said first user, said noise floor measure and said estimated neighbour cell interference power; and
a load scheduler configured to schedule uplink load in said wireless communication system based on said estimated noise rise measure.

14. A base station of a wireless communication system including an arrangement for noise rise estimation, said arrangement comprising:
a digital receiver configured to receive signals from a plurality of users;
an interference whitener connected to said digital receiver, wherein the interference whitener is based on one of GRAKE and chip equalization, and is configured to provide interference whitening for said plurality of users at an output; and
a processor connected to said digital receiver and to said output from said interference whitener, wherein the processor is configured to:
measure received total wideband power received at said digital receiver a plurality of times;

generate a measure of an own cell power a plurality of times;

compute an estimate of a noise floor measure based on at least a number of said measured received total wideband powers and said generated measures of an own cell power;

compute an estimate of a neighbour cell interference power for individual ones of said plurality of users based on at least a number of said measured received total wideband powers and said generated measures of an own cell power;

determine a useful signal power for a first user of said plurality of users after interference whitening;

derive a first user noise floor compensation factor based on combining weights used for said first user in said interference whitening;

obtain a code power to interference ratio measure for said first user; and calculate a noise rise measure for said first user, based at least on said useful signal power for said first user after interference whitening, said first user noise floor compensation factor, said code power to interference ratio measure for said first user, said noise floor measure and said estimated neighbour cell interference power.

* * * * *

UNITED STATES PATENT AND TRADEMARK OFFICE
CERTIFICATE OF CORRECTION

Page 1 of 1

PATENT NO. : 8,982,701 B2
APPLICATION NO. : 13/581592
DATED : March 17, 2015
INVENTOR(S) : Wigren It is certified that error appears in the above-identified patent and that said Letters Patent is hereby corrected as shown below:

In the Specification

In Column 1, Line 50, delete "thea mal" and insert -- thermal --, therefor.

In Column 3, Line 10, delete "Further more," and insert -- Furthermore, --, therefor.

In Column 6, Lines 17-18, delete "theanal" and insert -- thermal --, therefor.

In Column 13, Line 1, delete "Grake+" and insert -- GRAKE+ --, therefor.

In Column 21, Line 47, delete "Theimal" and insert -- Thermal --, therefor.

Signed and Sealed this
Twentieth Day of October, 2015

Michelle K. Lee
*Director of the United States Patent and Trademark Office*